United States Patent
Jaradi et al.

(10) Patent No.: US 12,077,122 B1
(45) Date of Patent: Sep. 3, 2024

(54) AIRBAG ON MOVEABLE BARS ADJACENT VEHICLE DOOR OPENING

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Saeed D. Barbat, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/181,111

(22) Filed: Mar. 9, 2023

(51) Int. Cl.
*B60R 21/21* (2011.01)
*B60R 21/217* (2011.01)
*B62D 25/04* (2006.01)

(52) U.S. Cl.
CPC .............. *B60R 21/21* (2013.01); *B62D 25/04* (2013.01); *B60R 2021/2173* (2013.01)

(58) Field of Classification Search
CPC . B60R 21/21; B60R 21/20; B60R 2021/2173; B60D 25/04; B60J 5/0443; B60J 5/079
See application file for complete search history.

(56) References Cited

U.S. PATENT DOCUMENTS

| | | | |
|---|---|---|---|
| 7,234,765 B1 | 6/2007 | Mazzei et al. | |
| 7,472,922 B2 * | 1/2009 | Wu | B60R 21/2338 280/730.2 |
| 9,688,312 B2 | 6/2017 | Maeshiro et al. | |
| 9,821,852 B2 | 11/2017 | Akhlaque-e-rasul et al. | |
| 10,525,922 B1 * | 1/2020 | Lin | B60R 21/2338 |
| 10,632,951 B2 | 4/2020 | Nusier et al. | |
| 10,906,488 B2 | 2/2021 | Santiago | |
| 11,554,647 B1 * | 1/2023 | Faruque | B60J 5/0479 |
| 11,577,680 B1 * | 2/2023 | Faruque | B60N 3/002 |
| 11,590,832 B1 * | 2/2023 | Patel | B62D 25/025 |
| 11,590,921 B1 * | 2/2023 | Farooq | B60R 21/23138 |
| 11,607,936 B1 * | 3/2023 | Barbat | B60J 5/0486 |
| 11,634,098 B1 * | 4/2023 | Line | B60N 2/77 280/730.2 |
| 2007/0102906 A1 * | 5/2007 | Wu | B60R 21/23184 280/730.2 |
| 2009/0184501 A1 * | 7/2009 | Hirotani | B60J 5/0452 280/730.2 |
| 2019/0291680 A1 * | 9/2019 | Baccouche | B60R 21/213 |
| 2023/0264555 A1 * | 8/2023 | Jaradi | B60R 19/00 180/274 |

FOREIGN PATENT DOCUMENTS

DE      10022094 A1    12/2001

* cited by examiner

*Primary Examiner* — Karen Beck
(74) *Attorney, Agent, or Firm* — Frank A. Mackenzie; Bejin Bieneman PLC (57) ABSTRACT

An assembly for a vehicle includes a front pillar and a rear pillar. The front pillar and the rear pillar define a door opening. The vehicle includes a first track supported by the front pillar and a second track supported by the rear pillar. The vehicle includes a bar extending from the first track to the second track. The bar is moveable relative to the first track and the second track from a lowered position to a raised position. The bar extends across the door opening in the raised position. The vehicle includes an airbag supported by the bar. The airbag is inflatable to an inflated position when the bar is in the raised position.

19 Claims, 9 Drawing Sheets

AIRBAG ON MOVEABLE BARS ADJACENT VEHICLE DOOR OPENING

BACKGROUND

A vehicle may include amenities that allow occupants ingress and egress of the vehicle. For example, a vehicle may not include a middle pillar to allow more space for occupants to ingress and egress the vehicle. Specifically, such vehicles may include two doors that meet at the location traditionally occupied by the middle pillar when in a closed position. The door may be rotatable about a front pillar and a rear pillar, respectively, such that the doors rotate away from each other to an open position.

DETAILED DESCRIPTION

A vehicle includes a front pillar and a rear pillar. The front pillar and the rear pillar define a door opening. The vehicle includes a first track supported by the front pillar and a second track supported by the rear pillar. The vehicle includes a bar extending from the first track to the second track. The bar is moveable relative to the first track and the second track from a lowered position to a raised position. The bar extends across the door opening in the raised position. The vehicle includes an airbag supported by the bar. The airbag is inflatable to an inflated position when the bar is in the raised position.

The bar may be elongated along an axis of the bar and the airbag in the inflated position is elongated along the axis of the bar.

The airbag may be elongated from the first track to the second track in the inflated position.

The assembly may include a covering on the bar, the airbag may be between the covering and the bar.

The assembly may include a passenger compartment, the airbag may be inflatable from the bar away from the door opening into the passenger compartment.

The assembly may include a second bar extending from the first track and the second track. The bar is moveable relative to the first track and the second track from a lowered position of the second bar to a raised position of the second bar. The second bar extends across the door opening in the raised position of the second bar. The assembly may include a rocker extending from the front pillar to the rear pillar. The rocker may define a slot elongated from the front pillar to the rear pillar. The slot may receive at least one of the bar and the second bar in the lowered positions of the bar and the second bar. The bar and the second bar may be vehicle-inboard of the door opening. The assembly may include a second airbag supported by the second bar. The second airbag may be inflatable to an inflated position when the second bar is in the raised position. The second bar may be elongated along an axis of the second bar and the second airbag in the inflated position may be elongated along the axis of the second bar. The assembly may include a passenger compartment. The airbag may be inflatable from the bar away from the door opening into the passenger compartment and the second airbag may be inflatable from the second bar away from the door opening into the passenger compartment.

The bar may be vehicle-inboard of the door opening.

The assembly may include a passenger compartment, the bar in the raised position may be in the passenger compartment.

The assembly may include a rocker extending from the front pillar to the rear pillar, the bar may be elongated along the rocker in the raised position and the lowered position.

The assembly may include a rocker extending from the front pillar to the rear pillar. The rocker may define a slot elongated from the front pillar to the rear pillar. The slot may receive the bar in the lowered position.

The first track and the second track are each elongated generally vertically.

The assembly may include a computer including a processor and a memory storing instructions executable by the processor to selectively move the bar from the lowered position to the raised position; and selectively move the bar from the raised position to the lowered position for occupant ingress and egress.

The assembly may include a computer including a processor and a memory storing instructions executable by the processor to identify a position of a door supported by the front pillar or the rear pillar of the vehicle as being in a closed position; identify the vehicle is in Drive; and move the bar from the lowered position to the raised position based on the identification of the door being in the closed position and/or the identification of the vehicle being in Drive. The memory stores instructions may be executable by the processor to identify the vehicle is in Park and move the bar from the raised position to the lowered position based on identification of the doors being in an open position and/or identification of the vehicle being in Park.

With reference to the Figures, wherein like numerals indicate like parts throughout the several views, an assembly 10 for a vehicle 12 includes a front pillar 14 and a rear pillar 16. The front pillar 14 and the rear pillar 16 define a door opening 18. The vehicle 12 includes a first track 20 supported by the front pillar 14 and a second track 22 supported by the rear pillar 16. The vehicle 12 includes a bar 24 extending from the first track 20 to the second track 22. The bar 24 is moveable relative to the first track 20 and the second track 22 from a lowered position to a raised position. The bar 24 extends across the door opening 18 in the raised position. The vehicle 12 includes an airbag 26 supported by the bar 24. The airbag 26 is inflatable to an inflated position when the bar 24 is in the raised position.

The bar 24 may be moved into the raised position when the vehicle 12 is in motion and lowered when the vehicle 12 is stopped. Specifically, the bar 24 may be moved between the raised position and lowered for occupant ingress and egress. In the raised position and in the event of an impact to the vehicle 12, the bar 24 extending across the door opening 18 manages deformation into the vehicle 12. As an example, in examples in which the vehicle 12 does not have a middle pillar, the extension of the bar 24 across the door opening 18 in the raised position manages deformation into the vehicle 12. In such an example, the bar 24 may provide reinforcement to the side of the vehicle 12 by managing deformation into the vehicle 12 in the event of the impact. In the raised position, the airbag 26 being on the bar 24 inflates to the inflation position to control kinematics of the occupant relative to the bar 24 in the event of a vehicle 12 impact. When the vehicle 12 is no longer in motion, the bar 24 is moveable to the lowered position to allow occupants of the vehicle 12 to enter and exit the vehicle 12 through the door opening 18.

Figure 1:
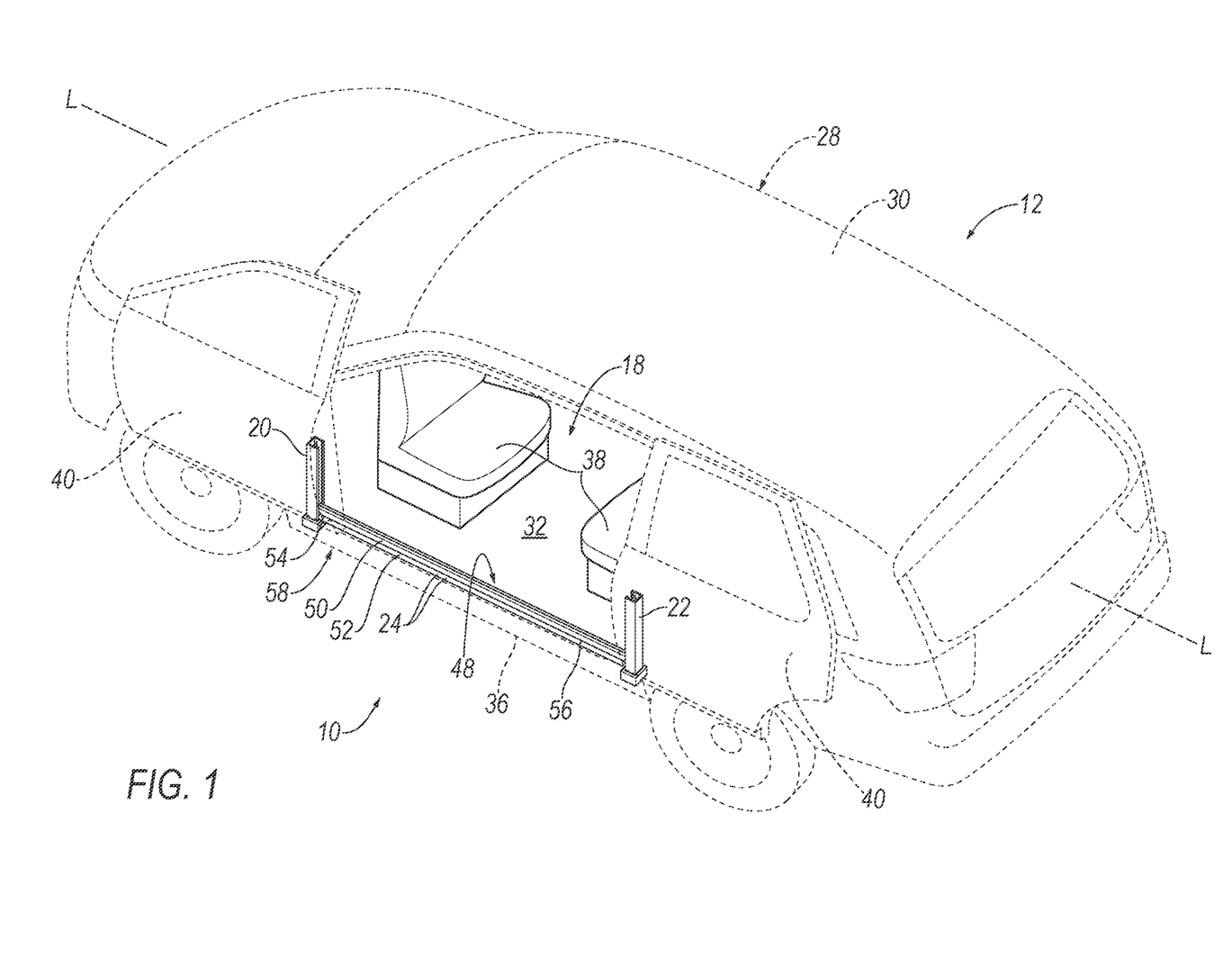
FIG. 1 is a perspective view of a vehicle having a pair of bars movable adjacent a pair of vehicle doors with the bars in a lowered position.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc.

The vehicle 12 includes a vehicle frame (not numbered) and a vehicle body 28. The vehicle frame and the vehicle body 28 may be of a unibody construction in which the frame is unitary with a vehicle body 28 (including frame rails, pillars, roof rails, etc.). As another example, the vehicle body 28 and vehicle frame may have a body-on-frame construction (also referred to as a cab-on-frame construction) in which the vehicle body 28 and frame are separate components, i.e., are modular, and the vehicle body 28 is supported on and affixed to the frame. Alternatively, the vehicle frame and vehicle body 28 may have any suitable construction. The vehicle frame and vehicle body 28 may be of any suitable material, for example, steel, aluminum, and/or fiber-reinforced plastic, etc.

The vehicle body 28 may define a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

With continued reference to FIG. 1, the vehicle body 28 includes two roof rails. The roof rails are spaced from one another in a cross-vehicle direction. The roof rails each extend longitudinally along the vehicle body 28, i.e., along a vehicle-longitudinal axis L.

The vehicle body 28 includes a vehicle roof 30. The vehicle roof 30 may define the upper boundary of the passenger compartment and may extend from the front end of the passenger compartment to the rear end of the passenger compartment. The vehicle roof 30 may extend from one roof rail to the other roof rail. The vehicle roof 30 may be irremovably fixed to the roof rails. In other words, the vehicle roof 30 is secured to the roof rails in such a way that removal requires destruction such as cutting, e.g., cutting material and/or welded joints, etc. As an example, the vehicle roof 30 may be attached to both roof rails, e.g., by welding, fasteners, etc.

With reference to FIGS. 1-4, the vehicle body 28 includes a vehicle floor 32 spaced downwardly from the vehicle roof 30. The vehicle floor 32 may define the lower boundary of the passenger compartment and may extend from the front end of the passenger compartment to the rear end of the passenger compartment. The vehicle floor 32 may include a floor panel and upholstery on the vehicle floor 32. The upholstery may be, for example, carpet, and may have a class-A surface facing the passenger compartment, i.e., a surface specifically manufactured to have a high quality, finished, aesthetic appearance free of blemishes. The vehicle floor 32 may include cross-beams (not shown) connected to the floor panel and to other components of the vehicle body 28.

The vehicle body 28 may include pillars spaced from each other along the vehicle-longitudinal axis L on both sides of the vehicle body 28. Specifically, the vehicle body 28 includes the front pillar 14 and the rear pillar 16 spaced vehicle-rearward from the front pillar 14 on each side of the vehicle body 28. For example, the vehicle body 28 includes the front pillar 14 and the rear pillar 16 on each side of the vehicle 12 with the front pillar 14 being spaced from the rear pillar 16. In other words, the front pillar 14 may be disposed at the front end of the passenger compartment. The pillars may extend from the vehicle roof 30 to the vehicle floor 32. The vehicle 12 may include other pillars in addition to the front pillar 14 and the rear pillar 16. For example, as shown in the Figures, the vehicle 12 may include another pillar disposed at the rear end of the passenger compartment on each side of the vehicle 12.

With continued reference to FIGS. 1-4, the vehicle body 28 includes a rocker 36 extending from the front pillar 14 to the rear pillar 16. Specifically, the vehicle body 28 may include two rockers 36, one on each side of the vehicle body 28. The rockers 36 are elongated along the vehicle-longitudinal axis L. The vehicle 12 may include two rockers 36, i.e., one rocker 36 on either side of the passenger compartment. The rockers 36 are spaced from the roof rails below the roof rails. The rockers 36 are below the passenger compartment. In some examples, the rockers 36 may be connected to the pillars in any suitable way, e.g., welding, adhesive, fasteners, etc. In other words, in such examples, the rockers 36 and the pillars, are separate from each other and connected to each other. In other examples, the rockers 36 may be unitary with the pillars, i.e., a single, uniform piece of material with no seams, joints, fasteners, or adhesives holding it together. In such an example, the pillars and the rocker 36 may be formed together simultaneously as a single continuous unit, e.g., by molding, forging, casting, stamping, etc. The vehicle floor 32 may be supported by the rockers 36.

The vehicle body 28 may define the door opening 18. Specifically, the vehicle body 28 may include one or more door opening 18 between pillars, of the vehicle body 28. In the example shown in the Figures, the front pillar 14 and the rear pillar 16 define the door opening 18. The door opening 18 may be between the front pillar 14 and the rear pillar 16 and between the rocker 36 and the roof rail. In other words, the pillars, are spaced from each other by the door opening 18 and the roof rail and rocker 36 are spaced from each other by the door opening 18. The door opening 18 extends uninterrupted from the front pillar 14 to the rear pillar 16. The door opening 18 extends uninterrupted from the rocker 36 to the roof rails. The door opening 18 allows for ingress and egress into the passenger compartment. The vehicle 12 may include any suitable number of door openings 18 to allow for ingress and egress into the passenger compartment. For example, as shown in the Figures, the vehicle 12 may include the door opening 18 on each side of the vehicle 12. In other examples, the vehicle 12 may include multiple door openings 18 on each side of the vehicle 12.

Figure 2:
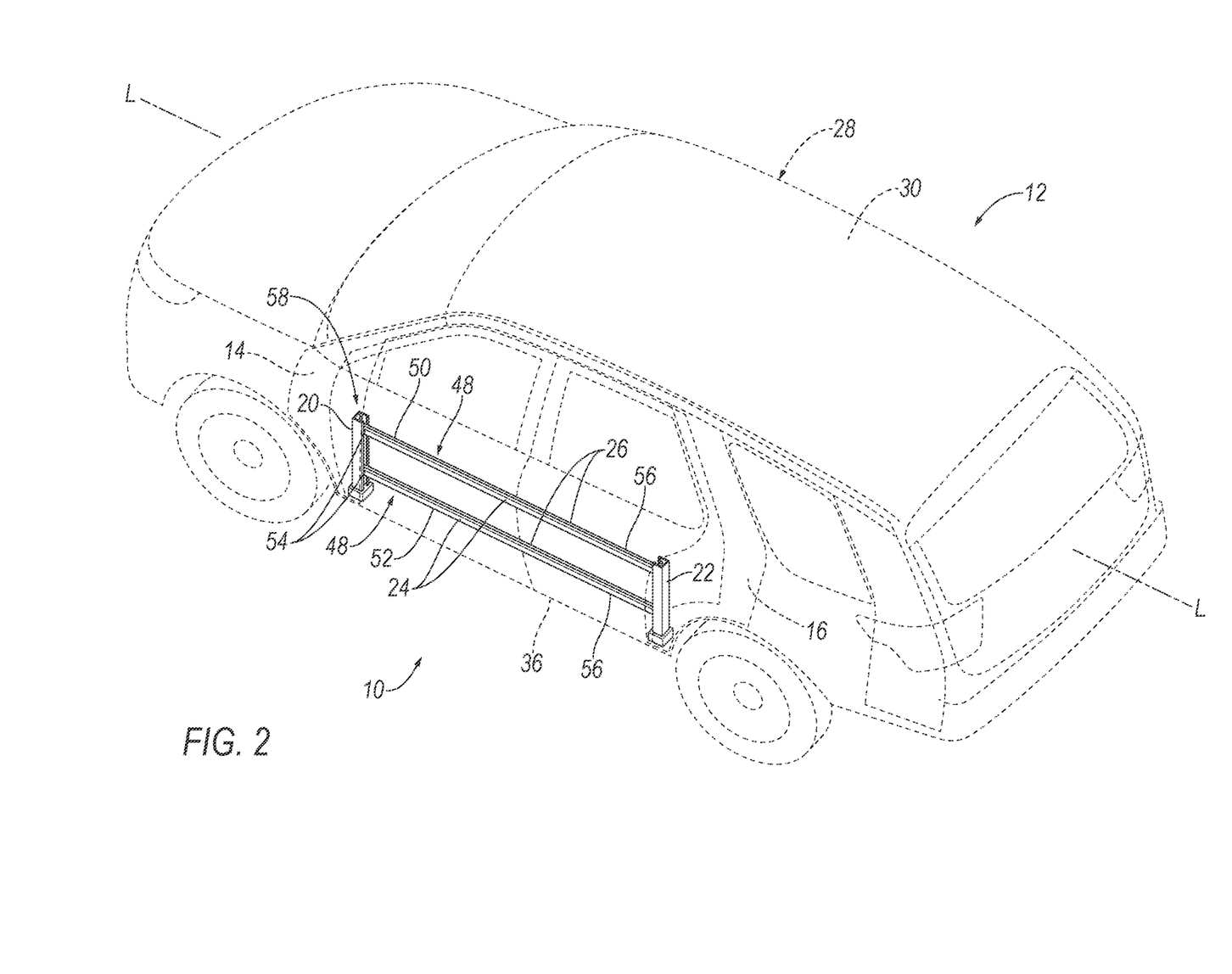
FIG. 2 is the perspective view of FIG. 1 with the bars in a raised position.
Figure 4:
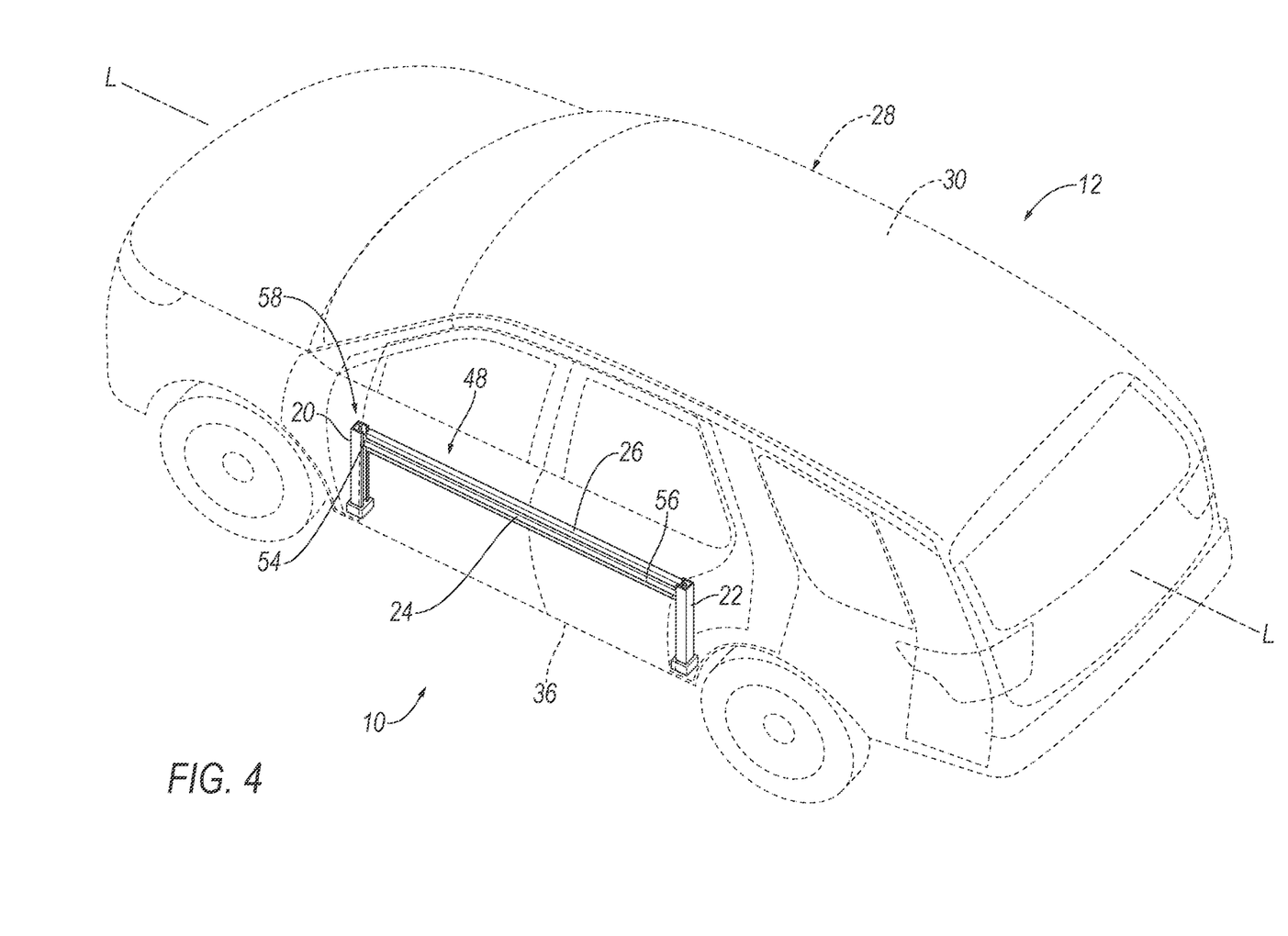
FIG. 4 is a perspective view of another example of the vehicle having one bar in the raised position.

With reference to FIGS. 2 and 4, the vehicle body 28 may not include a middle pillar between the front pillar 14 and the rear pillar 16, i.e., the vehicle body 28 may not include a middle pillar, e.g., a B-pillar, between the front pillar 14 and the rear pillar 16 from the vehicle floor 32 to the vehicle roof 30. In other words, the vehicle body 28 is B-pillarless. The vehicle body 28 lacking a middle pillar allows for the door opening 18 to extend from the front pillar 14 to the rear pillar 16. The door opening 18 extending from the front pillar 14 to the rear pillar 16 allows occupants easier access to the passenger compartment for ingress and egress.

The vehicle 12 may include one or more seats 38. Specifically, the vehicle 12 may include any suitable number of seats 38. The seats 38 are supported by the vehicle floor 32. The seats 38 may be arranged in any suitable arrangement in the passenger compartment. As in the example shown in the Figures, one or more of the seats 38 may be at the front end of the passenger compartment, e.g., a driver seat 38 and/or a passenger seat 38. In other examples, one or more of the seats 38 may be behind the front end of the passenger compartment, e.g., at the rear end of the passenger compartment. The seats 38 may be moveable relative to the vehicle floor 32 to various positions, e.g., moveable fore-and-aft and/or cross-vehicle. The seat 38 may be of any suitable type, e.g., a bucket seat 38. The seats 38 may be adjacent the door openings 18 in the vehicle body 28.

With continued reference to FIGS. 1-4, the vehicle 12 includes a plurality of doors 40, e.g., a front door 40 and a rear door 40 on each side of the vehicle body 28, moveable from a closed position to an open position for vehicle 12 occupants to enter and exit a passenger compartment. The front door 40 may be supported by the front pillar 14 and the rear door 40 may be supported by the rear pillar 16 in the door opening 18. In the closed position, the doors 40 are in at least one of the door openings 18 in the vehicle body 28. In the example shown in FIGS. 1-4, the first door 40 and the second door 40 are both in the single door opening 18 in the vehicle body 28. In the open position, at least one of the door openings 18 in the vehicle body 28 may be exposed. Each of the doors 40 are adjacent a seat 38 in the vehicle 12. Each of the front seats 38 and each of the rear seats 38 may be adjacent a door 40 of the vehicle 12. Specifically, each front seat 38 may be adjacent a front door 40 and each rear seat 38 may be adjacent a rear door 40. The doors 40 are vehicle-outboard from each of the front seats 38 and each of the rear seats 38.

As shown in the example in FIGS. 1-4, the doors 40 may be slidably supported by the vehicle body 28. For example, the vehicle body 28 may include a track with the doors 40 being slidably supported by the track. Each of the doors 40 is moveable, i.e., slidable, from the closed position to the open position. In the closed position, the doors 40 on each side of the vehicle 12, i.e., the front door 40 and the rear door 40, are adjacent each other. As the doors 40 move to the open position, the front door 40 moves away from the rear door 40 toward the front end of the passenger compartment and the rear door 40 moves away from the front door 40 toward the rear end of the passenger compartment.

The numerical adverbs "first" and "second" with respect to the doors 40 are used herein merely as identifiers and do not signify order or importance. The terms "first" and second" may be used interchangeably when referring to the doors 40 as shown in the Figures.

The door outer may define a portion of the exterior of the vehicle 12. For example, the door outer may present a class-A surface, i.e., a surface specifically manufactured to have a high-quality, finished aesthetic appearance free of blemishes. The door outer may be metal (such as steel, aluminum, etc.) or polymeric (such as fiber reinforced plastic composite, etc.).

The door inner may be metal (such as steel, aluminum, etc.) or polymeric (such as fiber reinforced plastic composite, etc.). The door inner provides structural rigidity for the door outer. The door inner may provide a mounting location for components of the door 40.

With reference to FIG. 1-4, the vehicle 12 includes at least one assembly 10. The assembly 10 includes the two tracks 20,22, the bar 24, and an airbag assembly 48. As set forth further below, the airbag assembly 48 is supported by the bar 24 and moves with the bar 24 as the bar 24 moves relative to the door opening 18. In the example in the Figures, the assembly 10 includes two bars 24, namely an upper bar 24,50 and a lower bar 24, 52. The assembly 10 may include one or more drive mechanisms 58 as discussed below, e.g., including a motor, a drive screw 64, and a carriage 62. The motor moves the bar 24 up and down, e.g., based on ingress/egress and/or occupancy. As described further below, in the event of a vehicle 12 impact, the airbag 26 inflates when the bar 24 is in the raised position.

The vehicle 12 may include any suitable number of assemblies 10 supported by the vehicle body 28. For example, the vehicle 12 may include an assembly 10 on each side of the passenger compartment. Each of the assemblies 10 on each side of the vehicle 12 may be identical to each other except being supported by opposite sides of the vehicle 12 with each assembly 10 being constructed as described above.

With reference to FIGS. 1-4, the assembly 10 may include one or more bars 24 moveable relative to the first track 20 and the second track 22 from the lowered position to the raised position. In the example shown in FIG. 4, the assembly 10 includes the bar 24 extending across the door opening 18 in the raised position. In the example shown in FIG. 2, the assembly 10 includes the bar 24 and a second bar 24 extending across the door opening 18 in the raised positions of the bar 24 and the second bar 24. In the example shown in FIGS. 3 and 4, the assembly 10 may include one bar 24 extending across the door opening 18. The assembly 10 may include any suitable number of bars 24 extending across the door opening 18. The number of bars 24 extending across the door opening 18 may be dependent on the height and type of vehicle 12. A pair of bars 24 may be used for vehicles 12 having a higher beltline. One single bar 24 may be used for vehicles 12 having a lower beltline. The bars 24, in the raised positions, manage deformation into the passenger compartment in the event of an impact to the vehicle 12.

With continued reference to FIGS. 2 and 4, the bar 24 in the raised position is in the passenger compartment. Specifically, in the raised position, the bar 24 may be exposed to the passenger compartment.

The bar 24 is elongated along an axis of the bar 24. In the examples including more than one bar 24, the axes of the bars 24 may be parallel in the raised positions, e.g., shown in the example in FIG. 2. In the example in the Figures, the bar 24 is elongated along the axis of the bar 24 and the second bar 24 is elongated along an axis of the second bar 24.

The bars 24 extend from the front pillar 14 to the rear pillar 16 in the raised position and the lowered position. Specifically, the bars 24 extend from a first end 54 supported by the front pillar 14 to a second end 56 supported by the rear pillar 16. The bars 24 extend from one side of the door opening 18 to the other side of the door opening 18. In other words, the bars 24 are elongated completely across the door opening 18 in the raised position. Specifically, the bars 24 extend continuously, i.e., unbroken, from the front pillar 14 to the rear pillar 16 in both the lowered position and the raised position. The bar 24 and the second bar 24 are vehicle-inboard of the door opening 18.

The bars 24 may be elongated along the rocker 36 in the raised position and the lowered position. Specifically, the bars 24 are elongated from the front pillar 14 to the rear pillar 16 along the rocker 36 when the bars 24 are in the lowered position and the raised position. The bars 24 may be vehicle-inboard of the rocker 36. Specifically, the bars 24 may be on a vehicle-inboard side of the rocker 36 both in the lowered position and the raised position The bars 24 are elongated adjacent the doors 40 of the vehicle 12. The bars 24 are in the raised position when the doors 40 are in the closed position, e.g., when the vehicle 12 is in motion, and the bars 24 are in the lowered position when the doors 40 are in the open position, e.g., when the vehicle 12 is no longer in motion. When the doors 40 are in the closed position and the bars 24 are in the raised position, the bars 24 are adjacent the doors 40. Specifically, when the doors 40 are in the closed position and the bars 24 are in the raised position, the bars 24 are vehicle-inboard of the doors 40. When the doors 40 are in the open position, the bars 24 are below the doors 40 and in the lowered position.

With reference to FIGS. 1-4, the assembly 10 includes the first track 20 supported by the front pillar 14 and the second track 22 supported by the rear pillar 16. Specifically, the first track 20 is supported by the front pillar 14 and the second track 22 is supported by the rear pillar 16. The tracks 20,22 may extend upwardly from the vehicle floor 32 toward the vehicle roof 30. Specifically, the first track 20 and the second track 22 are each elongated generally vertically along the front pillar 14 and the rear pillar 16. The adverb "generally" means that the tracks 20,22 may deviate from vertical due to manufacturing or architecture of the vehicle body 28. In the example shown in the Figures, the tracks 20,22 may include a "C" shaped cross-section, but the tracks 20,22 may be of any suitable cross-section.

The tracks 20,22 may be exposed to the passenger compartment. In other words, the vehicle 12 does not include trim panels that cover the tracks 20,22. The assembly 10 may include rubber covers (not shown) over the tracks 20,22 to conceal any mechanism inside the track.

The assembly 10 may include any suitable number of tracks 20,22 supported by the pillars. As shown in the example in the Figures, a single track 20 may be supported by the front pillar 14 and a single track 22 may be supported by the rear pillar 16. In such an example, the of the bar 24 and the second bar 24 are both movable relative to the tracks 20,22 supported by the pillars. In other examples, multiple tracks 20,22 may be supported by the front pillar 14 and multiple tracks 20,22 may be supported by the rear pillar 16. In such examples, each bar 24 may be supported by one track 20,22 supported by the pillars, i.e., the number of tracks 20,22 supported by each pillar may be equal to the number of bars 24 movable relative to the pillars.

Figure 5:
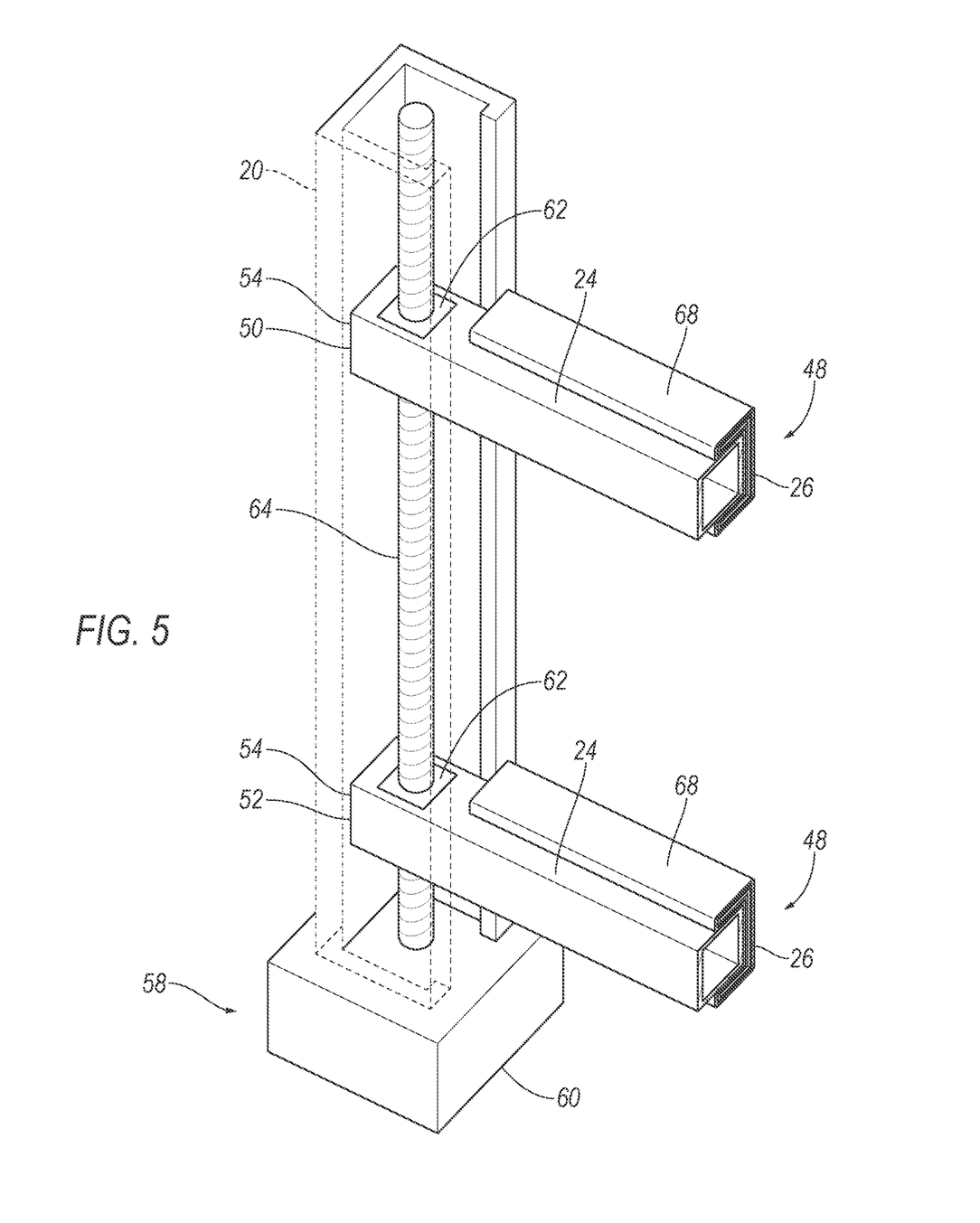
FIG. 5 is a perspective view of the pair of bars movable adjacent the pair of doors, the bars movable along a track.

With reference to FIG. 5 the assembly 10 may include one or more drive mechanisms 58 fixed to one or more of the tracks 20,22 and drivably coupled to the of the bar 24 and the second bar 24 to move the of the bar 24 and the second bar 24 along the tracks 20,22 between the raised position and the lowered position. Specifically, as shown in the example in the Figures, the vehicle 12 may include a drive mechanism 58 coupled to the bars 24 at the first end 54 to move the bars 24 along the first track 20 and a second drive mechanism 58 coupled to the bars 24 at the second end 56 to move the bars 24 along the second track 22. Each of the drive mechanisms 58 may move simultaneously such that the first end 54 and the second end 56 each move simultaneously. In other words, the drive mechanisms 58 at each of the first end 54 and the second end 56 move the first end 54 and the second end 56 at the same rates As shown in the example in the Figures, the drive mechanism 58 may include the drive screw 64 extending along the tracks 20,22, i.e., from a bottom of the tracks 20,22 to a top of the tracks 20,22. The bars 24 include the carriage 62 at each of the ends of the bars 24 that allows the bars 24 to move along the drive screw 64 to a predetermined height. The drive mechanism 58 may include an electric motor 60 fixed to each of the tracks 20,22, e.g., for driving the drive screw 64 or equivalent mechanism. The electric motor 60 may rotate the drive screw 64 to move the bars 24 between the lowered position and the raised position. The carriage 62 carries the bars 24 along the threading of the drive screw 64 to move bars 24 along the tracks 20,22. The threading of the drive screw 64 may be tuned to adjust the rate at which the bars 24 may move along the tracks 20,22. The drive mechanism 58 may be in communication with a sensor (not shown) identifying the location of the bars 24 along the tracks 20,22. In other examples, the drive mechanism 58 may include any suitable mechanism to move the bars 24 from the lowered position to the raised position.

In examples such as shown in the Figures, one or more of the bars 24 may include a clutch that releases when the bar 24 reaches a desired height. The clutch allows the bars 24 to move to different heights along the tracks 20,22. For example, the tracks 20,22 may include a stop (not shown) that stops one of the bars 24 at a height, in which case the clutch allows the drive screw 64 to continue to rotate without transmitting rotation to the carriage 62 on one of the bars 24 so that the drive screw 64 may continue to rotate and move the other of the bars 24.

Figure 6:
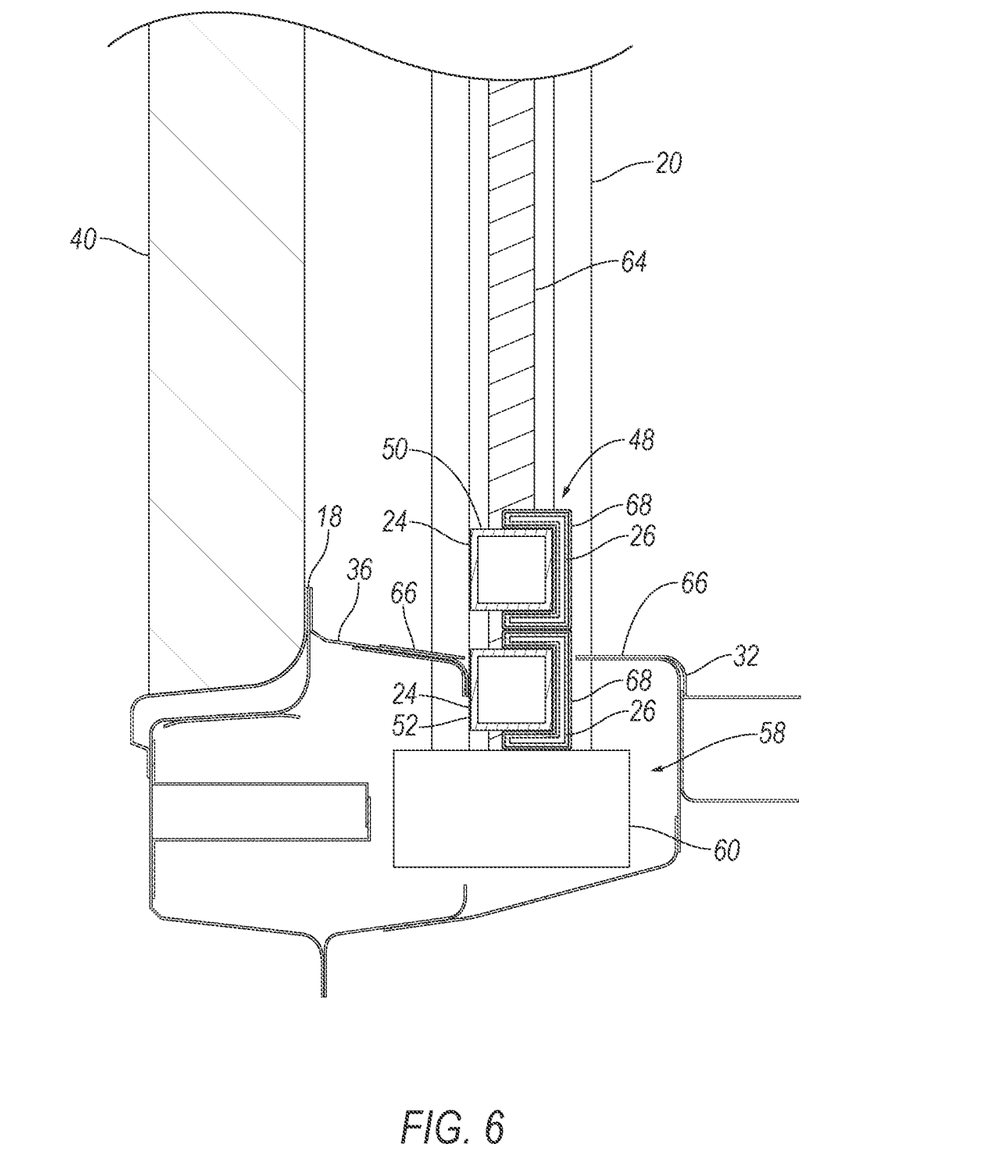
FIG. 6 is a cross-sectional view through line 6 in FIG. 1.

With reference to FIG. 6, a cross-sectional view through line 6 of FIG. 2, the rocker 36 may define a slot 66 elongated from the front pillar 14 to the rear pillar 16. The slot 66 may be between the vehicle floor 32 and the rocker 36. The slot 66 may be sized and shaped to receive at least one of the bar 24 and the second bar 24 in the lowered positions of the bar 24 and the second bar 24. In the example shown in FIGS. 6, the bar 24 and second bar 24 are both received by the slot 66 in the rocker 36 when the bar 24 and second bar 24 are in the lowered positions. In other examples, such as examples including only one bar 24, the bar 24 is received by the slot 66 in the rocker 36 when the bar 24 is in the lowered position.

Figure 3:
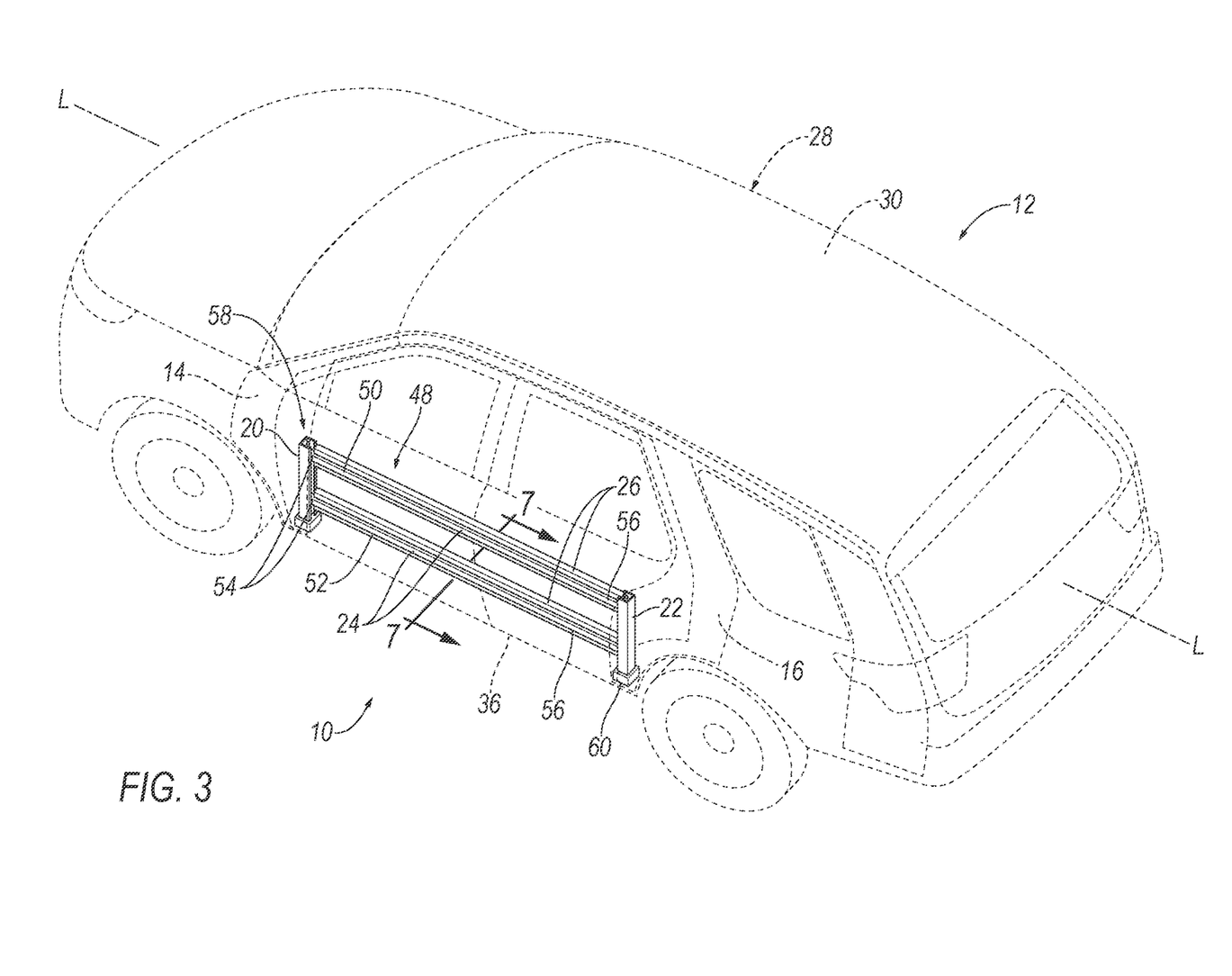
FIG. 3 is a perspective view of a FIG. 2 with airbags on the bars inflated.
Figure 7:
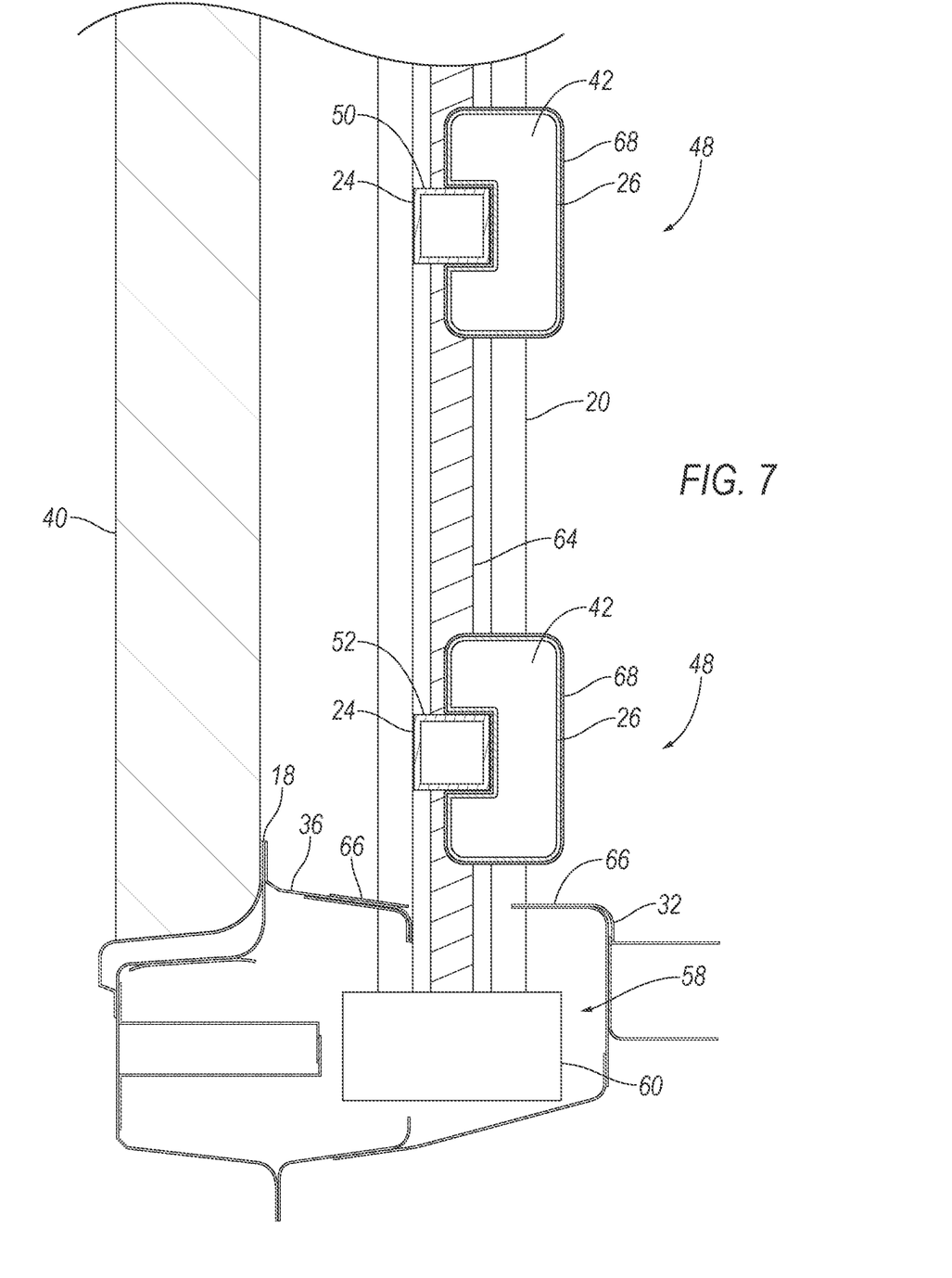
FIG. 7 is a cross-sectional view through line 7 in FIG. 3.

As set forth above, the assembly 10 includes the airbag assembly 48. Specifically, the assembly 10 includes at least one airbag assembly 48 and, in the example shown in the Figures, the assembly 10 includes two airbag assemblies 48, specifically, one airbag assembly 48 on each bar 24. The airbag assembly 48 includes the airbag 26 and may include a covering 68 on the bar 24. The airbag assembly 48 includes an inflator 70. The inflator 70 inflates the airbag 26 from an uninflated position, as shown in FIGS. 2 and 6 to the inflated position, as shown in FIGS. 3 and 7. In examples including the covering 68, the covering 68 covers the airbag 26 in the uninflated position.

The airbag assembly 48 is on the bar 24. In the example shown in the Figures, the assembly 10 may include one airbag assembly 48 on both bars 24, respectively, e.g., one airbag assembly 48 on the upper bar 24, 50 and one airbag assembly 48 on the lower bar 24, 52. In such examples, the airbag assemblies 48 may be similar or identical.

As set forth above, the airbag assembly 48 may include the covering 68 supported by the bar 24. The covering 68 may be cloth, leather, faux leather, or any other suitable material. The covering 68 may have a class-A surface, i.e., a finished surface exposed to view by a customer and free of unaesthetic blemishes and defects. The covering 68 may be stitched in panels around the bar 24. As described further below, the covering 68, may include one or more tear seams through which the airbag assembly 48 is deployable.

The airbag 26 is supported by the bar 24 in the uninflated position and the inflated position. In other words, the weight of the airbag 26 is borne by the bar 24. In the example shown in the Figures, the airbag 26 is between the covering 68 and the bar 24, e.g., mounted to the bar 24 below the covering 68 of the bar 24. The airbag 26 may be rolled and/or folded to fit within the covering 68 in the uninflated position and may break through tear seams in the covering 68 to the inflated position. The bar 24 is rigid relative to the covering 68. The airbag 26 may be anchored to the bar 24, e.g., with fasteners. The airbag 26 is inflatable away from the door opening 18 between the door opening 18 and the seat 38 from the uninflated position to the inflated position. The airbag 26 being mounted on the bar 24 alleviates packaging constrains and accommodates the operation of the airbag 26. In the event of a vehicle-side side impact, the airbag 26 inflates to the inflated position to control certain kinematics of the occupant seat 38.

The airbag 26 is inflatable to an inflated position when the bar 24 is in the raised position. Specifically, the airbag 26 is inflatable between the door opening 18 and the seat 38 when the bar 24 is in the raised position. Accordingly, the airbag 26 controls kinematics of an occupant between the occupant and the bar 24, e.g., in the event of certain vehicle-side side impact. When the bar 24 is in the lowered position, the airbag 26 is completely recessed in the slot 66. In other words, the airbag 26 is below the door 40 when the bar 24 is in the lowered position.

The airbag 26 is inflatable from the bar 24 away from the door opening 18 into the passenger compartment. In the example in the Figures, the airbag 26 is inflatable in the cross-vehicle direction from the bar 24 between the door opening 18 and the seat 38. In such an example, the airbag 26 abuts the bar 24 in the inflated position. Specifically, the airbag 26 uses the bar 24 as a reaction surface to control the kinematics of the occupants.

The airbag 26 in the inflated position is elongated along the axis of the bar 24. In other words, the longest dimension of the airbag 26 is along the axis of the bar 24. The longest dimension of the airbag 26 may be designed to extend along the entire bar 24. As an example, the airbag 26 may be elongated from the first track 20 to the second track 22 in the inflated position. In such an example, the airbag 26 is inflatable to the inflated position extending across the door opening 18.

The airbag 26 may be fabric, e.g., a woven polymer. For example, the fabric may be woven nylon yarn, for example, nylon. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane. The airbag 26 includes an inflation chamber 42 inflatable with inflation medium from the inflator 70.

As set forth above, the airbag assembly 48 includes at least one inflator 70 to inflate the airbag 26. The inflator 70 is in fluid communication with the airbag 26. The inflator 70 expands the airbag 26 with inflation medium, such as a gas, to move the airbag 26 from the uninflated position to the inflated position. The inflator 70 may be supported by any suitable component. For example, the inflator 70 may be supported by the bar 24. In other words, in such an example, the weight of the inflator 70 is borne by the bar 24 and the inflator 70 moves with the bar 24 between the raised and lowered position. In such an example, one inflator 70 may be on each bar 24, respectively, to inflate the airbag 26 on that bar 24. In another example, the inflator 70 may be fixed to the vehicle body 28, e.g., the rocker 36. In such an example, the bar 24 moves relative to the inflator 70 between the raised and lowered position and the inflator 70 may be in fluid communication with the airbag 26 with, for example, fill tubes.

The inflator 70 may be, for example, a pyrotechnic inflator 70 that ignites a chemical reaction to generate the inflation medium, a stored gas inflator 70 that releases (e.g., by a pyrotechnic valve) stored gas as the inflation medium, or a hybrid. In the example shown in the Figures, one inflator 70 is in fluid communication, e.g., with fill tubes, with the airbag 26 on the bar 24 and another inflator 70 is in fluid communication with the second airbag 26 on the second bar 24. In other examples, any suitable number of inflators 70 may be in fluid communication with any suitable number of airbags 26 and/or components of any one airbag 26.

Figure 8:
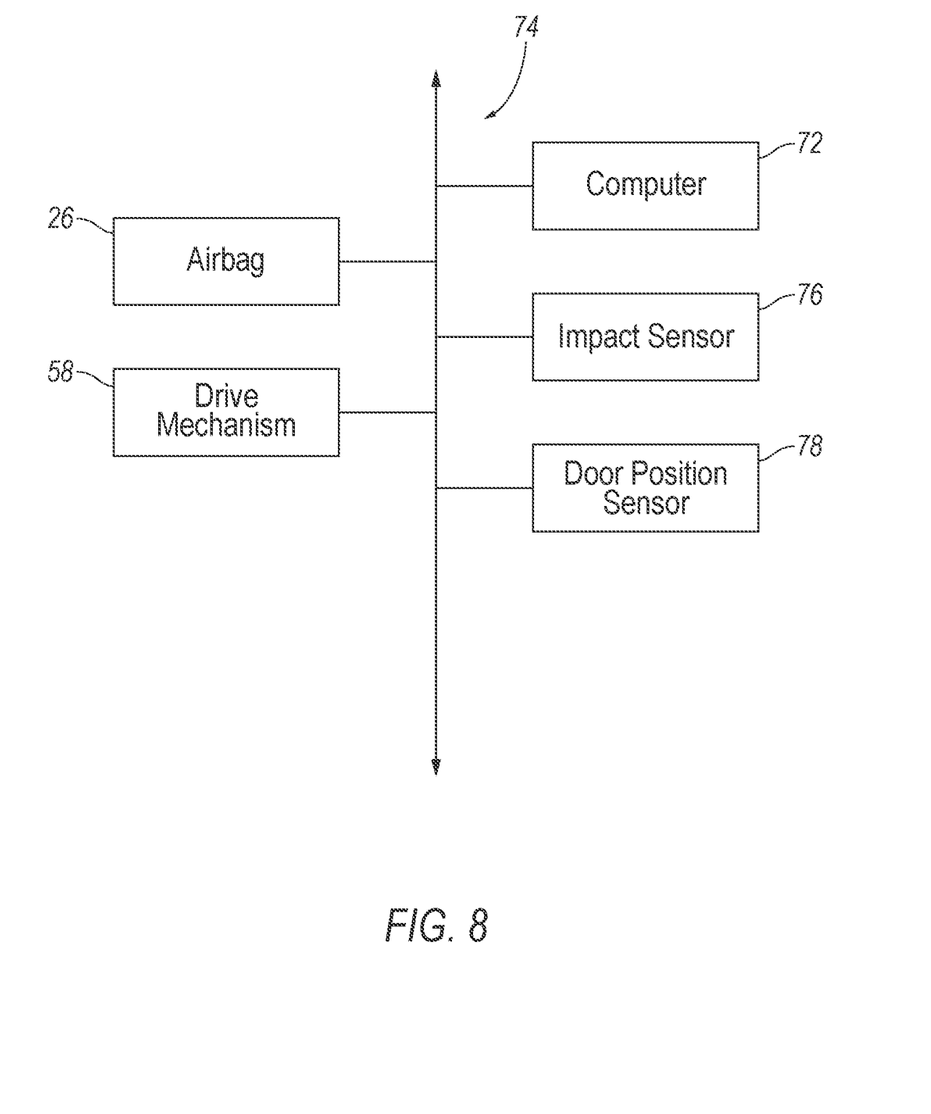
FIG. 8 is block diagram of a vehicle communication network of the vehicle.

The computer 72 includes a processor and a memory. The memory includes one or more forms of computer 72 readable media, and stores instructions executable by the processor for performing various operations, including as disclosed herein. For example, the computer 72 can be a generic computer 72 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 72 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 72. The memory can be of any type, e.g., hard disk drives, solid state drives, servers, or any volatile or non-volatile media. The memory can store the collected data sent from the sensors. The memory can be a separate device from the computer 72, and the computer 72 can retrieve information stored by the memory via a network in the vehicle 12, e.g., over a CAN bus, a wireless network, etc. Alternatively or additionally, the memory can be part of the computer 72, e.g., as a memory of the computer 72. The computer 72 may include programming to operate one or more of vehicle 12 brakes, propulsion e.g., control of acceleration in the vehicle 12 by controlling one or more of an internal combustion engine, electric motor 60, hybrid engine, etc., steering, climate control, interior and/or exterior lights, etc., as well as to determine whether and when the computer 72, as opposed to a human operator, is to control such operations. Additionally, the computer 72 may be programmed to determine whether and when a human operator is to control such operations. The computer 72 may include or be communicatively coupled to, e.g., via a vehicle 12 network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. As shown in FIG. 8, the computer 72 is generally arranged for communications on a vehicle communication network 74 that can include a bus in the vehicle 12 such as a controller area network CAN or the like, and/or other wired and/or wireless mechanisms. Alternatively or additionally, in cases where the computer 72 actually comprises a plurality of devices, the vehicle communication network 74 may be used for communications between devices represented as the computer 72 in this disclosure. Further, as mentioned below, various controllers and/or sensors may provide data to the computer 72 via the vehicle communication network 74.

The vehicle 12 may include at least one impact sensor 76 for sensing certain impacts of the vehicle 12, and the computer 72 in communication with the impact sensor 76. Alternatively or additionally to sensing impact, the impact sensor 76 may be configured to sense impact prior to impact, i.e., pre impact sensing. The impact sensor 76 is configured to detect an impact to the vehicle 12. The impact sensor 76 may be of any suitable type, for example, post contact sensors such as accelerometers, pressure sensors, and contact switches; and pre impact sensors 76 such as radar, LIDAR, and vision sensing systems. The vision sensing systems may include one or more cameras, CCD image sensors, CMOS image sensors, etc. The impact sensor 76 may be located at numerous points in or on the vehicle 12.

The vehicle 12 may include door position sensors 78 to determine the position of the doors 40, i.e., door position sensors 78 may indicate whether the doors 40 are in the open position or the closed position. The door position sensors 78 may be in communication with the computer 72. The door position sensors 78 may send a signal to the computer 72 to indicate whether the doors 40 are in the open position or the closed position. The vehicle 12 may include any suitable number of door position sensors 78 to determine the position of multiple doors 40 in the vehicle 12. In other words, the vehicle 12 may include a number of door position sensors 78 equal to the number of doors 40 in the vehicle 12.

The bars 24 may move to the raised position and the lowered position based on motion of the vehicle 12. The bars 24 may move to the raised position in the event of powered movement of the vehicle 12 in either a vehicle-forward direction, e.g., Drive, or a vehicle-rearward direction, e.g., Reverse. The bars 24 may move to the lowered position in the event of ceasing powered movement of the vehicle 12 in the vehicle-forward direction or vehicle-rearward direction. As an example, the vehicle 12 may include a transmission (not shown) that may be shifted between gears for driving the vehicle 12 to indicate the direction of motion of the vehicle 12. The transmission may be shifted to Park, Reverse, Neutral, or Drive by a driver of the vehicle 12. The transmission be shifted to gears other than those gears previously listed depending on the type of vehicle 12 and the engine of the vehicle 12. In other examples, the vehicle 12 may include motors (not shown) that indicate the powered movement of the vehicle 12 in the vehicle-forward direction or the vehicle-rearward direction. The vehicle 12 may include motion sensors that identify whether the vehicle 12 is moving in the vehicle-forward direction or in the vehicle-rearward direction, e.g., Drive versus Reverse, or whether the vehicle 12 is no longer in motion, e.g., Park. The motion sensors may be in communication with the computer 72 to indicate whether the vehicle 12 may be in motion.

Figure 9:
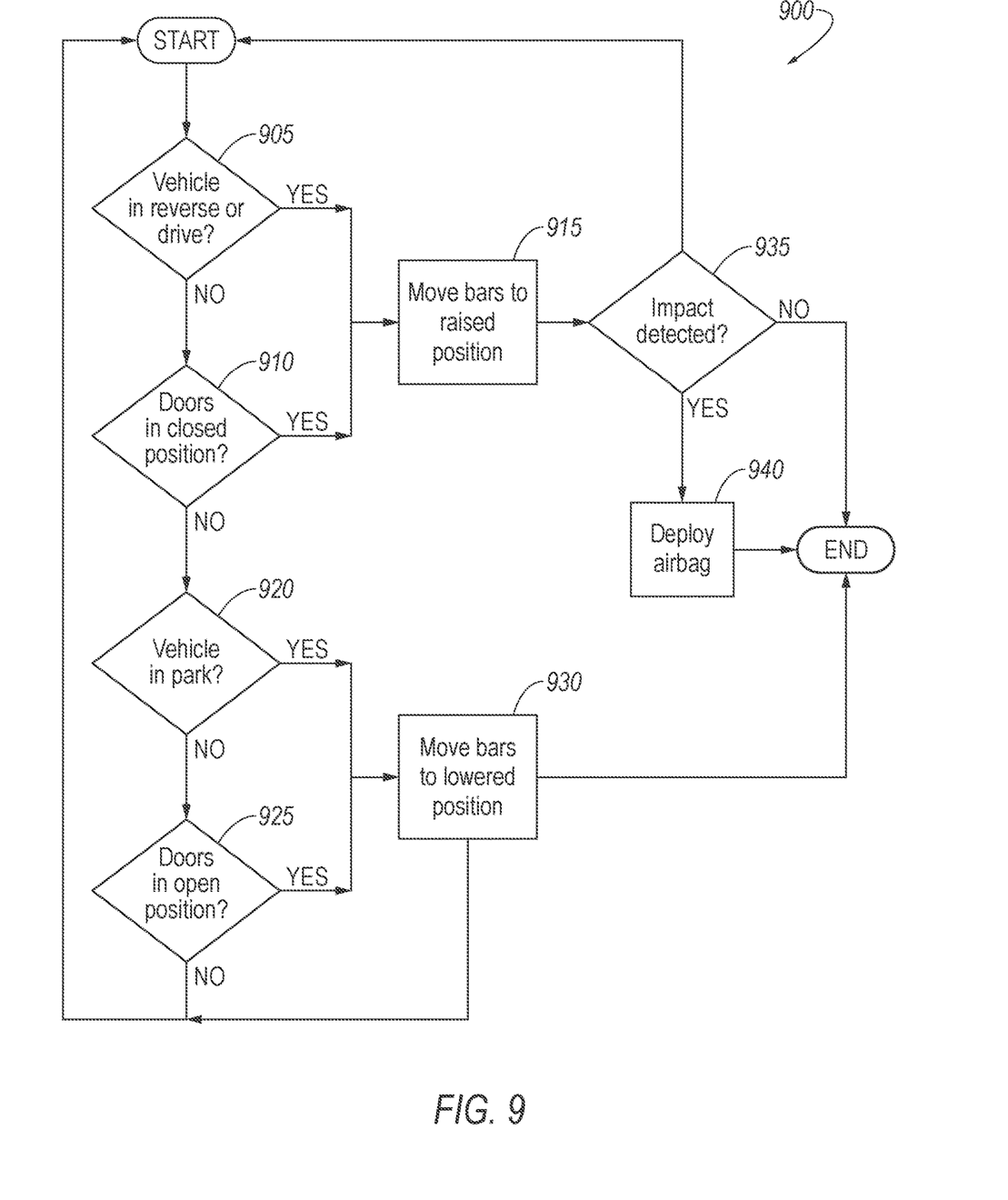
FIG. 9 is a flow chart of an example process.

With reference to FIG. 9, the computer 72 stores instructions to control components of the vehicle 12 according to the method 900 shown in FIG. 9. Specifically, as shown in FIG. 9, the method 900 includes instructions for moving the bars 24 from the lowered position to the raised position and from the raised position to the lowered positions based on other conditions. Use of "in response to," "based on," and "upon determining" herein, including with reference to method 900, indicates a causal relationship, not merely a temporal relationship.

With reference to decision block 905, the method 900 includes identifying whether the vehicle 12 is in Drive or Reverse. In other words, the method 900 includes identifying whether the vehicle 12 may be in motion in the vehicle-forward direction or in the vehicle-rearward direction. The motion sensors may send a signal to the computer 72 indicating the direction of the motion of the vehicle 12. If the vehicle 12 is not identified as being in Drive or Reverse, the method 900 moves to decision block 910.

With reference to decision block 910, if the vehicle 12 is not identified as being in Drive or Reverse, the method 900 includes identifying whether or not the doors 40 are in the closed position. The door position sensors 78 may send a signal to the computer 72 indicating the position of the doors 40. If the doors 40 are not identified as being in the closed position, the method 900 moves to decision block 920.

With reference to block 915, based on identifying the vehicle 12 is in Drive or Reverse and/or based on identifying the position of the doors 40 as being in the closed position, the method 900 includes moving the bars 24 from the lowered position to the raised position. The computer 72 may send a signal over the vehicle communication network 74 to the drive mechanism 58 to rotate the drive screw 64 to move the bars 24 to the raised positions.

With reference to decision block 920, if the doors 40 are not identified as being in the closed position, the method 900 includes identifying whether the vehicle 12 is in Park. In other words, the method 900 includes identifying whether the vehicle 12 may be stationary or allowing passengers to enter or exit the passenger compartment. The motion sensors may send a signal to the computer 72 to indicate the vehicle 12 is in Park. If the vehicle 12 is not identified as being in Park, the method 900 moves to decision block 925.

With reference to decision block 925, if the vehicle 12 is not identified as being in Park, the method 900 includes identifying whether the doors 40 are in the open position. The door position sensors 78 may send a signal to the computer 72 indicating the position of the doors 40. If the doors 40 are not identified as being in the open position, the method 900 returns to its start.

The reference to block 930, based on identifying the vehicle 12 has been shifted to Park and/or based on identifying that the doors 40 are in the open position, the method 900 includes moving the bars 24 from the raised position to the lowered position to allow passengers to enter or exit the vehicle 12. The computer 72 may send a signal to the electric motors 60 to rotate the lead screw to move the bars 24 to the raised position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:
1. A vehicle comprising:
a front pillar and a rear pillar defining a door opening between the front pillar and the rear pillar;

a first track supported by the front pillar and a second track supported by the rear pillar;

a bar extending from the first track to the second track and moveable relative to the first track and the second track from a lowered position to a raised position, the bar extending across the door opening in the raised position; and an airbag supported by the bar, the airbag being inflatable to an inflated position when the bar is in the raised position.

2. The vehicle of claim 1, wherein the bar is elongated along an axis of the bar and the airbag in the inflated position is elongated along the axis of the bar.

3. The vehicle of claim 1, wherein the airbag is elongated from the first track to the second track in the inflated position.

4. The vehicle of claim 1, further comprising a covering on the bar, the airbag being between the covering and the bar.

5. The vehicle of claim 1, further comprising a passenger compartment, the airbag being inflatable from the bar away from the door opening into the passenger compartment.

6. The vehicle of claim 1, further comprising a second bar extending from the first track and the second track and moveable relative to the first track and the second track from a lowered position of the second bar to a raised position of the second bar, the second bar extending across the door opening in the raised position of the second bar.

7. The vehicle of claim 6, further comprising a rocker extending from the front pillar to the rear pillar and defining a slot elongated from the front pillar to the rear pillar, the slot receiving at least one of the bar and the second bar in the lowered positions of the bar and the second bar.

8. The vehicle of claim 6, wherein the bar and the second bar are vehicle-inboard of the door opening.

9. The vehicle of claim 6, further comprising a second airbag supported by the second bar, the second airbag being inflatable to an inflated position when the second bar is in the raised position.

10. The vehicle of claim 9, wherein the second bar is elongated along an axis of the second bar and the second airbag in the inflated position is elongated along the axis of the second bar.

11. The vehicle of claim 9, further comprising a passenger compartment, the airbag being inflatable from the bar away from the door opening into the passenger compartment and the second airbag being inflatable from the second bar away from the door opening into the passenger compartment.

12. The vehicle of claim 1, wherein the bar is vehicle-inboard of the door opening.

13. The vehicle of claim 1, further comprising a passenger compartment, the bar in the raised position being in the passenger compartment.

14. The vehicle of claim 1, further comprising a rocker extending from the front pillar to the rear pillar, the bar being elongated along the rocker in the raised position and the lowered position.

15. The vehicle of claim 1, further comprising a rocker extending from the front pillar to the rear pillar and defining a slot elongated from the front pillar to the rear pillar, the slot receiving the bar in the lowered position.

16. The vehicle of claim 1, wherein the first track and the second track are each elongated generally vertically.

17. The vehicle of claim 1, further comprising a computer including a processor and a memory storing instructions executable by the processor to:
   selectively move the bar from the lowered position to the raised position;
   selectively move the bar from the raised position to the lowered position for occupant ingress and egress.

18. The vehicle of claim 1, further comprising a computer including a processor and a memory storing instructions executable by the processor to:
   identify a position of a door supported by the front pillar or the rear pillar of the vehicle as being in a closed position;
   identify the vehicle is in Drive; and
   move the bar from the lowered position to the raised position based on the identification of the door being in the closed position and/or the identification of the vehicle being in Drive.

19. The vehicle of claim 18, wherein the memory stores instructions executable by the processor to identify the vehicle is in Park and move the bar from the raised position to the lowered position based on identification of the doors being in an open position and/or identification of the vehicle being in Park.

* * * * *